July 2, 1963 — F. M. STOUT — 3,095,853
AQUARIUM STRUCTURAL UNIT
Filed July 21, 1961 — 2 Sheets-Sheet 1
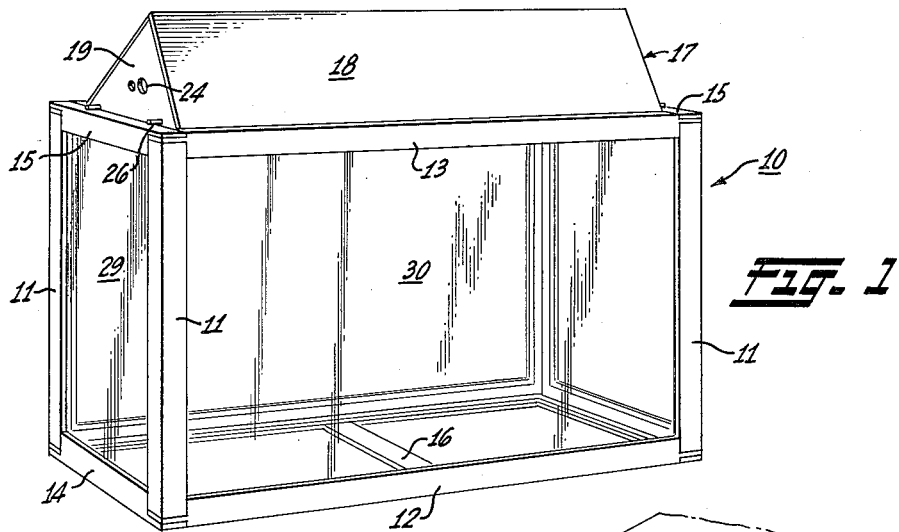
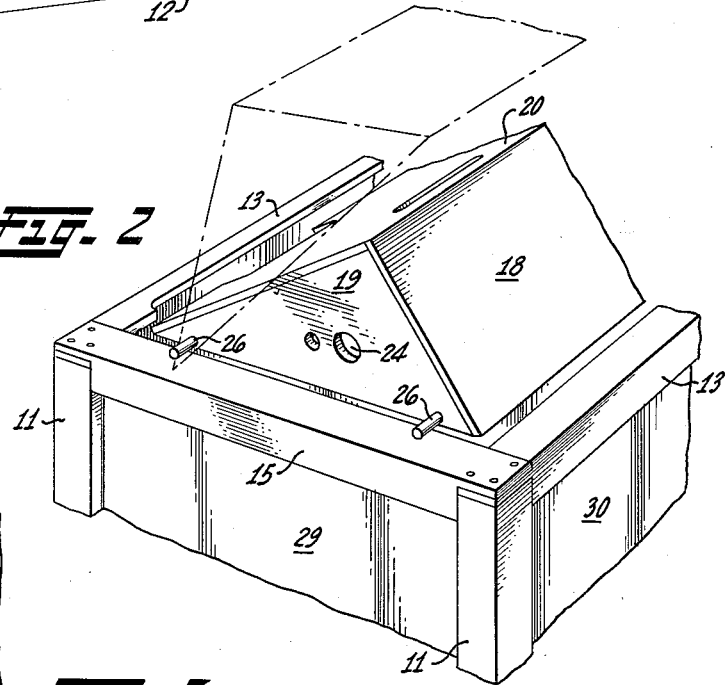
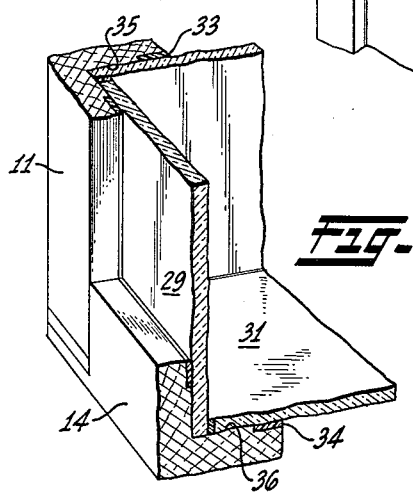
INVENTOR:
FRANK M. STOUT
BY
ATTORNEYS July 2, 1963
F. M. STOUT
3,095,853
AQUARIUM STRUCTURAL UNIT
Filed July 21, 1961
2 Sheets-Sheet 2
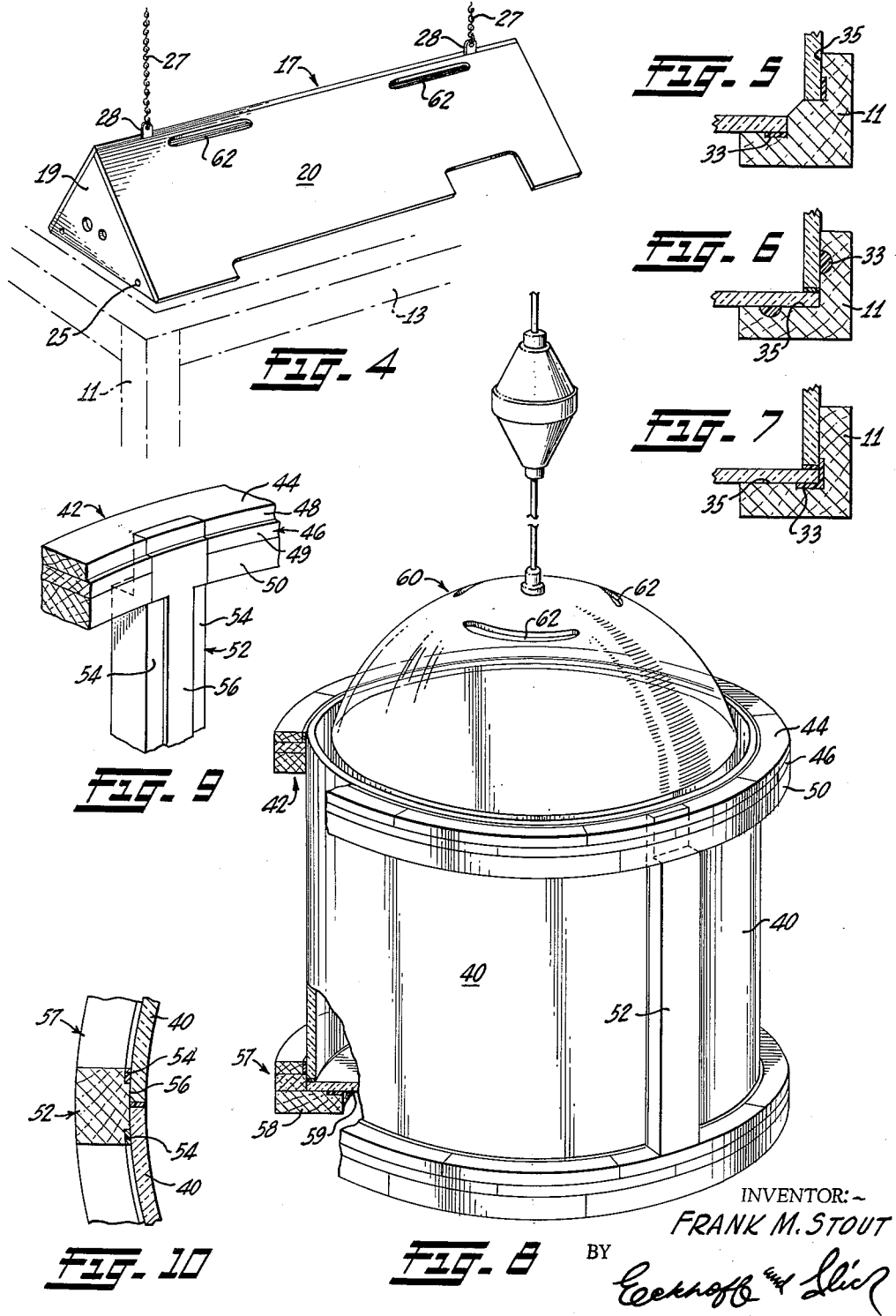
INVENTOR:—
FRANK M. STOUT
BY
Eckhoff ＆ Slick
ATTORNEYS United States Patent Office 3,095,853
Patented July 2, 1963

3,095,853
AQUARIUM STRUCTURAL UNIT
Frank M. Stout, 384 St. Francis Blvd., Daly City, Calif.
Filed July 21, 1961, Ser. No. 125,838
7 Claims. (Cl. 119—5)

This invention relates in general to aquariums and more particularly to improved aquariums which may, if desired, be assembled in a home workshop.

Wood is generally regarded as a desirable material from which to fashion aquariums since the finished product may best be harmonized with the furniture in the room where the aquarium is to be placed. However, because wood is relatively porous and warps after prolonged contact with water, metal frameworks have been used almost universally. This is particularly true in the case of the "assemble-it-yourself" type aquariums for amateurs have difficulty in obtaining a proper seal between the framework members and the transparent panels.

It is therefore an object of this invention to provide an aquarium which may be constructed utilizing wood and transparent panels.

It is a further object of this invention to provide an aquarium which may be supplied in knocked-down form and assembled at the site of use.

Yet another object of this invention is to provide an aquarium framework so constructed that the mastic or putty used to seal the transparent panels and framework cannot be squeezed out of place and the seal destroyed.

Yet another object of this invention is to provide an aquarium having a hood or reflector which serves to discourage evaporation of the water from the tank and which prevents contact of moisture condensed on the inner surface of the hood with the upper edges of the tank.

Generally, this invention comprises an aquarium which may be constructed of wood and which is provided with a land and groove structure in the horizontal and vertical support members such that water pressure against the transparent panel members is not transmitted to the mastic used to seal the panels in place, but rather is transmitted to lands, permitting the mastic to be retained in place without difficulty. Further, because, in plan view, the covers utilized in the aquariums of this invention are smaller than their respective tanks, condensation from the interior of the covers is not permitted to contact the uppermost edges of the tanks.

In the drawings:

FIGURE 1 is a perspective view of one form of the aquarium of this invention;

FIGURE 2 is an enlarged fragmentary perspective view of the upper portion of the aquarium of FIGURE 1 showing the manner of hood removal;

FIGURE 3 is an enlarged fragmentary sectional view of one corner of the aquarium of FIGURE 1;

FIGURE 4 is a perspective view of the hood of FIGURE 1 taken from the opposite side shown in FIGURE 1 and showing an alternative method for supporting the hood;

FIGURES 5–7 are enlarged sectional views showing alternative means of providing the necessary seal between the transparent panels and the corner posts;

FIGURE 8 shows the aquarium of this invention in a cylindrical embodiment;

FIGURE 9 is an enlarged perspective view of a portion of one of the upright supports utilized in the structure of FIGURE 8;

FIGURE 10 is a plan view of a portion of the post and collar structure of the aquarium of FIGURE 8 also showing the manner in which the transparent walls are sealed in place.

Referring now more particularly to the drawings in which like reference numerals indicate like parts in the several views, the preferred embodiment of the aquarium which is the subject of this invention is indicated generally at 10. The tank portion of the aquarium has four corner posts 11, two bottom side rails 12, two top side rails 13, two bottom end rails 14 and two top end rails 15. The rails and posts may be cut to size from wood molding of standard stock. The rails are all half-lap jointed at both ends to provide a convenient and reliable means for joining rails and posts at each aquarium corner, as shown in FIGURES 1, 2, and 3. In addition, the bottom sides of the two bottom side rails 12 are horizontally notched or half-lap jointed approximately at the center of each rail to receive the corresponding half-lap joints of a cross-support member 16. A cover for the tank or hood portion is shown generally at 17, and is constructed of a front section 18, two side sections 19 and a back section 20.

The side sections 19 are provided with electric inlet holes 24 and a plurality of bores 25 for receiving and holding supporting dowels 26 which extend outward from the end sections 19. The dowels rest on top end rails 15.

Alternative means, such as chains 27 and brackets 27, may be used to support the hood above the top rails; see FIGURE 4. The back section 20 of hood 17 may have several notched and cutout portions which may be used to accommodate various aquarium accessories such as a heating unit, pump, etc. It is desirable that the rear top rail have its top surface out to accommodate such accessories, as seen in FIGURE 2.

Two end panes 29, two side panes 30 and a bottom 31, all preferably of glass, are provided. Alternative transparent materials, such as certain types of plastics, may be used, as may an opaque bottom.

The interior sides of the rails and posts are all notched or channeled, as shown at 33 and 34 (FIGURE 3 and FIGURES 5–7) so as to provide land portions 35 and 36 in the posts and rails respectively.

FIGURES 8, 9, and 10 show a somewhat different embodiment of the invention wherein two semi-cylindrical glass walls 40 are held together by a collar 42. The collar is conveniently prepared from arcuate sections of laminated stock in such manner that the inner edge of the uppermost lamination 44 is spaced radially from that 46 immediately therebelow so that a notch 48 and land portion 49 are provided above lowermost lamination 50. Each upright support beam 52 (only one of two is shown in FIGURE 8) is notched at the topmost portion thereof and the remaining upstanding portion registers with a notch in the collar 42, as shown in FIGURE 9. Post 52 is also notched longitudinally at either corner, designated 54, to provide a land portion 56 which, as seen in FIGURE 10 is placed directly against the point of juncture of the semi-cylindrical glass elements. The notched areas 54 and 33 are all filled with mastic, as is the space between confronting plate edges; see FIGURES 6, 7 and 10.

A second collar 57 is provided at the base thereof for the purposes of securing together the base of the cylindrical tank and the side walls thereof. If desired, a single cylinder (preferably of glass or clear plastic) may be used in which case the upper collar 42 may not be necessary. In any case the lowermost collar 57 is required. Conveniently, it includes a pair of upper laminations (corresponding to laminations 44 and 47 of collar 42) and a lowermost lamination 58 which is sufficiently wider than the others to support base 59. Essential are grooves or notches on either side of the line of juncture of the base and walls lands being provided adjacent said line of juncture. This arrangement insures that a proper seal of bottom and walls is obtained without the sealing compound being forced out of the grooves or notches as the lands so formed resist the pressure of the water within the tank, and no substantial pressure is exerted directly on the sealer.

The cylindrical aquarium is also provided with a transparent dome 60 which is conveniently suspended as shown in FIGURE 8. Once again, a horizontal space is provided between the lower lip of the cover and the upper edge of the tank so that condensation will drain directly into the tank and not contact the upper edge thereof.

The assembly of the aquarium may be accomplished in the following manner: one top end rail 15 and one top side rail 13 are joined at the half-lap joints by applying glue and pressure means to form a right angle. The same process is repeated with the other top end and side rails; then the two portions are joined together so as to form a complete top frame. A similar process is then followed with the bottom end rails 14 and bottom side rails 12 so as to form a complete bottom frame. The crosspiece 16 is then positioned in the half-lap joints of the bottom side rails and glue and pressure applied, as described above.

The posts 11 are then positioned in the bottom frame, one in each corner, glue and pressure applied. To give stability to the framework small nails may be inserted horizontally through the posts into the ends of the rails. The top frame is then placed upon the upright posts and the same procedure followed as described above.

The hood portion of the rectangular tank is assembled as follows: the two side or end pieces 19 are glued along the edge opposite the hypotenuse. The back portion 20 is then placed thereon and "squared" along the edges. The short side of the side pieces is then glued and the front section 18 placed thereon and "squared" so that it covers both the glued edges of the side pieces and the uppermost horizontal edge of the back piece. For added stability small nails may then be inserted through the back and front sections and into the glued edges of the side section. The dowels are then inserted into the holes 25.

It is recommended that the inside of the hood section 17 be coated with a protective coating, such as a resin, so as to provide waterproofing protection for the wood.

The final step in the assembly of a complete aquarium unit is the glazing (a term used generally for setting glass into a framework). The aquarium frame is placed on any side and an appropriate mastic or putty used, preferably a rubber base compound, e.g. the material "Elaskan." The mastic is applied to the inside shoulder of the lands 35 and 36 of the posts and rails, respectively, in sufficient thickness to fill the channeled portions 33 and 34 which become reservoirs or compartments between the rails or posts and the glass panes. A pane is then placed in position so that it is seated upon the land portion of one side and flush against the land portion of the opposite corner side, as best shown in FIGURE 3. As shown in FIGURES 6 and 7 mastic or putty may be placed between the confronting pane edges or surfaces. This process is repeated with the opposite side pane, the two end panes, and the bottom pane. It should be noted that as each pane is put into position, slight surface pressure should be evenly applied to insure that it is firmly seated against the appropriate land. After the bottom pane is positioned, and excess mastic removed, the aquarium is completed and ready for use.

In somewhat similar fashion the cylindrical tank is assembled from the wall element or elements 40, the segmented collar 57 and possibly 42 and the dome 60. If the upright posts 52 and two semi-cylindrical wall elements are used, the notched areas 48 and 54 are filled with mastic which contacts wall elements on either side of the line of juncture thereof. Thus, a tight seal is provided without pressure being exerted on the mastic itself. Rather, the lands bear the weight of the transparent panels and resist the pressure exerted by the water within the tank so that the mastic is not squeezed out of place.

Note that both of the covers or dome structures 17 and 60 are provided with slots 62 near the tops thereof. This is important as the heating effect contributed by the lights within the hood members results in convection currents of air which air is allowed to exit through the tops of the covers. Fresh air is admitted through the air moat between the upper-most edge surface of each tank and the lower-most edge of each hood and passes out through the slots 62. (The bulb for hood 60 is not shown but is located directly beneath the point of attachment of the suspension cord-electrical conductor.) These thermal currents result in constant contact of fresh air with the surface of the water within the tanks. It is well recognized that it is the contact of fresh air with the water surface which results in the incorporation of additional oxygen in the water. The conventional bubblers are inadequate means of introducing oxygen into water to the extent that bubbles tend to rise from the bottoms of tanks with little of the oxygen being dissolved, the major portion of such dissolution taking place only at the upper water-air interface. The structure described above permitting circulation of air beneath the hoods and out through the slots 62 provides means for aerating water which is closely akin to the natural aeration procedures taking place at the surface of naturally occurring bodies of water.

The relatively small size of each cover, the shape thereof and the method shown for suspending the cover member 17 or 60 insures that condensation forming on the inner surface of the cover members passes directly from the cover lip down into the aquarium water without contacting the topmost edges of the aquarium tank structure. This obviates the bacteria growth problem usually encountered where a cover rests directly on the tank lip and also keeps the moisture in the tank, where it belongs. Irrespective of the method used to suspend the dome or cover member, the essential feature is the provision of space between the uppermost edge of the aquarium tank proper and lowermost lip of the cover member.

Obviously, many modifications and variations may be made without departing from the spirit and scope of this invention, and therefore only such limitations should be imposed as are indicated in the appended claims.

I claim:
1. In an aquarium:
   (a) a tank structure having generally upright sides and a bottom whereby to form an enclosure for holding water, said upright sides terminating in upper edges;
   (b) a cover supported thereover in close proximity to said tank, said cover having edges substantially conforming to the figure defined by said upper edges of said sides, an edge of said cover being spaced inwardly from the corresponding tank side edge, the space so formed constituting a first ventilating air passageway, said cover further including a single second ventilating passageway therethrough spaced a substantial distance from the aforementioned first ventilating passageway.
2. In an aquarium:
   (a) a tank structure of a generally rectangular configuration having four upright sides and a bottom whereby to form an enclosure for holding water, said upright sides terminating in upper edges;
   (b) a cover having projecting supports extending therefrom, said supports resting upon the said upper edges of the said tank sides, said cover being supported in close proximity to said tank, the cover edges substantially conforming to the figure defined by said edges of said sides, at least two edges of the said cover being spaced inwardly from the corresponding tank side edges, the spaces so formed constituting ventilating passageways, said cover further including at least a single additional ventilating passageway therethrough spaced to substantial distance from the first mentioned ventilating passageways.

3. The structure of claim 1 wherein the cover is generally triangular in cross section.

4. In an aquarium:
(a) a tank structure having four generally rectangular upright sides and a bottom whereby to form an enclosure for holding water, said upright sides terminating in upper edges;
(b) a cover supported thereover, said cover being suspended from means anchored above the said cover whereby to support the said cover in close proximity to said tank, the said cover having edges substantially conforming to the figure defined by said upper edges of said sides, at least a pair of edges of said cover being spaced inwardly from the corresponding tank side edges, the spaces so formed constituting ventilating air passageways, the said cover further including at least a single additional ventilating passageway therethrough spaced a substantial distance from the first mentioned ventilating passageways.

5. The structure of claim 4 wherein the said cover is generally triangular in cross section.

6. In an aquarium:
(a) a tank structure having generally upright sides and a bottom whereby to form an enclosure for holding water, said upright sides constituting a continuous cylindrical chamber terminating in upper edges;
(b) a cover supported thereover in close proximity to said tank, the said cover having edges substantially conforming to the figure defined by the said edges of the said sides, the said edges of the said cover being spaced inwardly from the corresponding tank side upper edges, the space so formed constituting a ventilating air passageway, said cover further including at least a single second ventilating passageway therethrough spaced a substantial distance from the aforementioned first ventilating passageway.

7. The structure of claim 6 wherein the cover is concave on the side thereof facing the interior of the tank structure and wherein an incandescent light bulb is positioned on the underside of the said cover to provide means for creating thermal currents within the said tank, said incandescent light bulb having a receptacle therefor secured to the said cover, said receptacle having a power line having an end thereof secured above the said tank whereby to provide means for suspending the said cover above the said tank.

References Cited in the file of this patent
UNITED STATES PATENTS

| | | |
|---|---|---|
| 2,002,380 | Wernicke et al. | May 21, 1935 |
| 2,776,642 | Sepersky | Jan. 8, 1957 |
| 2,787,981 | Landesberg | Apr. 9, 1957 |
| 2,792,811 | Di Chiaro | May 21, 1957 |
| 3,018,758 | Arnould | Jan. 30, 1962 |

FOREIGN PATENTS

| | | |
|---|---|---|
| 662,842 | Germany | July 22, 1938 |
| 489,736 | Great Britain | Aug. 3, 1938 |

OTHER REFERENCES

Popular Science Magazine, January 1945, page 178.